United States Patent
Oner-Deliormanli et al.

(10) Patent No.: US 10,131,121 B2
(45) Date of Patent: Nov. 20, 2018

(54) FILMS CONTAINING FUNCTIONAL ETHYLENE-BASED POLYMER COMPOSITION

(71) Applicants: DOW GLOBAL TECHNOLOGIES LLC, Midland, MI (US); DOW BRASIL S.A., São Paulo (BR)

(72) Inventors: Didem Oner-Deliormanli, Bellaire, TX (US); Marlos G. Oliveira, Lake Jackson, TX (US); Ashish Batra, Zionsville, IN (US); Rajen M. Patel, Lake Jackson, TX (US); Brian W. Walther, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 217 days.

(21) Appl. No.: 14/405,896

(22) PCT Filed: Mar. 5, 2013

(86) PCT No.: PCT/US2013/029109
§ 371 (c)(1),
(2) Date: Dec. 5, 2014

(87) PCT Pub. No.: WO2013/184187
PCT Pub. Date: Dec. 12, 2013

(65) Prior Publication Data
US 2015/0151517 A1    Jun. 4, 2015

Related U.S. Application Data

(60) Provisional application No. 61/655,652, filed on Jun. 5, 2012.

(51) Int. Cl.
*B32B 7/02* (2006.01)
*B32B 7/04* (2006.01)
(Continued)

(52) U.S. Cl.
CPC .............. *B32B 27/08* (2013.01); *B32B 27/06* (2013.01); *B32B 27/32* (2013.01); *B32B 27/327* (2013.01);
(Continued)

(58) Field of Classification Search
None
See application file for complete search history.

(56) References Cited

U.S. PATENT DOCUMENTS

| 4,639,398 | A |   | 1/1987 | Bergstrom |            |
|-----------|---|---|--------|-----------|------------|
| 4,684,579 | A | * | 8/1987 | Mizuhara  | B23K 35/288 |
|           |   |   |        |           | 148/430    |

(Continued)

FOREIGN PATENT DOCUMENTS

| EP | 1136536 A1 | 9/2001 |
| EP | 1298168 A1 | 4/2003 |

(Continued)

OTHER PUBLICATIONS

Becker, ANTEC, 1991, p. 1389-1394.
(Continued)

*Primary Examiner* — Vivian Chen

(57) ABSTRACT

The invention provides a film comprising at least two layers, a first layer and a second layer; and wherein the first layer is formed from a first composition comprising a polyester, a polylactic acid, or a combination thereof; and wherein the second layer is formed from a second composition comprising at least the following: A) functionalized ethylene-based polymer, and B) ethylene/alpha-olefin interpolymer; and wherein the first layer is adjacent to the second layer.

6 Claims, 2 Drawing Sheets

(51) Int. Cl.

| | | |
|---|---|---|
| B32B 27/08 | (2006.01) | |
| B32B 27/32 | (2006.01) | |
| B32B 27/36 | (2006.01) | |
| C09J 7/00 | (2018.01) | |
| C09J 7/22 | (2018.01) | |
| C09J 7/25 | (2018.01) | |
| C09J 123/04 | (2006.01) | |
| C09J 123/06 | (2006.01) | |
| C09J 123/08 | (2006.01) | |
| C09J 123/26 | (2006.01) | |
| C08L 23/04 | (2006.01) | |
| C08L 23/06 | (2006.01) | |
| C08L 23/08 | (2006.01) | |
| C08L 23/26 | (2006.01) | |
| B32B 27/06 | (2006.01) | |

(52) U.S. Cl.
CPC ............ *B32B 27/36* (2013.01); *B32B 7/02* (2013.01); *B32B 7/04* (2013.01); *B32B 2250/02* (2013.01); *B32B 2250/24* (2013.01); *B32B 2307/716* (2013.01); *B32B 2307/7166* (2013.01); *B32B 2323/04* (2013.01); *B32B 2323/043* (2013.01); *B32B 2323/046* (2013.01); *B32B 2367/00* (2013.01); *B32B 2553/00* (2013.01); *C08L 23/04* (2013.01); *C08L 23/06* (2013.01); *C08L 23/08* (2013.01); *C08L 23/0807* (2013.01); *C08L 23/0846* (2013.01); *C08L 23/26* (2013.01); *C08L 2203/16* (2013.01); *C08L 2205/02* (2013.01); *C08L 2207/06* (2013.01); *C08L 2207/062* (2013.01); *C09J 7/00* (2013.01); *C09J 7/22* (2018.01); *C09J 7/25* (2018.01); *C09J 7/255* (2018.01); *C09J 123/04* (2013.01); *C09J 123/06* (2013.01); *C09J 123/08* (2013.01); *C09J 123/0807* (2013.01); *C09J 123/0846* (2013.01); *C09J 123/26* (2013.01); *C09J 2467/006* (2013.01); *Y10T 428/2495* (2015.01); *Y10T 428/24959* (2015.01); *Y10T 428/2813* (2015.01); *Y10T 428/2817* (2015.01); *Y10T 428/2826* (2015.01); *Y10T 428/2878* (2015.01); *Y10T 428/31786* (2015.04); *Y10T 428/31797* (2015.04)

(56) References Cited

U.S. PATENT DOCUMENTS

| | | | |
|---|---|---|---|
| 5,045,401 A * | 9/1991 | Tabor | B32B 7/12 428/516 |
| 5,089,556 A * | 2/1992 | Tabor | B32B 15/08 525/64 |
| 5,837,358 A | 11/1998 | Bauer et al. | |
| 6,027,776 A | 2/2000 | Mueller | |
| 6,063,462 A * | 5/2000 | Tsukamoto | B32B 27/32 428/332 |
| 6,177,516 B1 * | 1/2001 | Hudak | C08J 7/047 525/71 |
| 6,183,863 B1 * | 2/2001 | Kawachi | B32B 27/08 428/355 AC |
| 6,274,246 B1 | 8/2001 | Eggers et al. | |
| 6,333,061 B1 * | 12/2001 | Vadhar | B32B 27/08 206/497 |
| 6,417,298 B1 * | 7/2002 | Ford | C08F 10/00 502/104 |
| 6,607,834 B2 * | 8/2003 | Davis | B29C 55/023 156/229 |
| 6,656,601 B1 | 12/2003 | Kawachi et al. | |
| 6,663,974 B2 * | 12/2003 | Kelch | B32B 27/08 428/458 |
| 6,872,458 B1 * | 3/2005 | Rudd | B32B 27/32 156/229 |
| 6,914,097 B2 * | 7/2005 | Ward | C08F 8/12 525/192 |
| 8,207,265 B2 * | 6/2012 | McGee | B32B 7/12 525/71 |
| 8,575,275 B2 * | 11/2013 | Henschke | B32B 1/08 525/285 |
| 8,637,159 B2 * | 1/2014 | Botros | B32B 7/12 428/516 |
| 8,673,451 B2 * | 3/2014 | Botros | B32B 27/08 264/210.7 |
| 8,685,539 B2 * | 4/2014 | Botros | C08L 23/0815 428/476.9 |
| 8,772,411 B2 * | 7/2014 | Lee | B32B 7/12 428/523 |
| 9,000,091 B2 * | 4/2015 | Lee | B32B 7/12 525/74 |
| 2001/0053821 A1 * | 12/2001 | Robert | C09D 123/0815 525/193 |
| 2002/0055006 A1 | 5/2002 | Vogel et al. | |
| 2002/0156207 A1 * | 10/2002 | Imuta | C09J 153/00 526/127 |
| 2003/0144424 A1 * | 7/2003 | Kurja | C08L 23/0815 525/240 |
| 2004/0249071 A1 * | 12/2004 | McFaddin | C08F 255/02 525/70 |
| 2005/0019516 A1 | 1/2005 | Pradel et al. | |
| 2005/0163996 A1 * | 7/2005 | Lee | B32B 27/32 428/355 R |
| 2006/0199914 A1 * | 9/2006 | Harris | C08F 210/16 525/242 |
| 2007/0254118 A1 | 11/2007 | Opusko et al. | |
| 2007/0275219 A1 | 11/2007 | Patel et al. | |
| 2008/0197540 A1 | 8/2008 | McAllister et al. | |
| 2008/0274314 A1 | 11/2008 | Gkinosatis | |
| 2008/0274328 A1 | 11/2008 | Gkinosatis | |
| 2008/0306217 A1 * | 12/2008 | Karjala | C08F 10/00 525/207 |
| 2010/0029827 A1 * | 2/2010 | Ansems | B32B 27/08 524/451 |
| 2010/0098935 A1 * | 4/2010 | McGee | B32B 7/12 428/319.3 |
| 2010/0143651 A1 * | 6/2010 | Silvis | B32B 27/08 428/141 |
| 2010/0160497 A1 * | 6/2010 | Karjala | C08F 8/00 524/13 |
| 2010/0304051 A1 * | 12/2010 | Henschke | B32B 1/08 428/17 |
| 2011/0297212 A1 | 12/2011 | Wu et al. | |
| 2015/0336365 A1 * | 11/2015 | Kupsch | B32B 27/32 428/476.9 |

FOREIGN PATENT DOCUMENTS

| | | |
|---|---|---|
| JP | 64-009253 A * | 1/1989 |
| JP | 0100925 | 1/1989 |
| JP | 64-045445 | 2/1989 |
| JP | 1317756 | 12/1989 |
| JP | 03-10664 | 5/1991 |
| JP | 06-126882 | 5/1994 |
| JP | 0300755 | 3/1997 |
| JP | 1003483 | 2/1998 |
| JP | 2002-27383 | 9/2002 |
| JP | 2009-01906 | 1/2009 |
| WO | 2001/055275 | 8/2001 |
| WO | 2004/029173 A1 | 4/2004 |
| WO | 2006/036708 A2 | 4/2006 |
| WO | 2008/079784 A2 | 7/2008 |
| WO | 2008080111 A1 | 7/2008 |
| WO | 2010/042334 A1 | 4/2010 |
| WO | 2010/042335 A1 | 4/2010 |

OTHER PUBLICATIONS

De Gooijer, Polym. Eng. Sci., 2001, vol. 41, p. 86-94.
Durgun, J. Adhesion Sci. Technol., 2005, vol. 19, p. 407-425.
Pietrasanta, Macromol. Chem. Phys., 1999, vol. 200, p. 142-149.

(56) References Cited

OTHER PUBLICATIONS

PCT/US2013/029109, Jul. 8, 2013, International Search Report and Written Opinion.
PCT/US2013/029109, Dec. 18, 2014, International Preliminary Report on Patentability.

* cited by examiner

Multilayer Barrier Structures

FILMS CONTAINING FUNCTIONAL ETHYLENE-BASED POLYMER COMPOSITION

REFERENCE TO RELATED APPLICATIONS

The present application claims the benefit of U.S. Provisional Application No. 61/655,652 filed Jun. 5, 2012.

BACKGROUND OF THE INVENTION

Polyethylene terephthalate (PET) is increasingly used as a barrier material in place of Nylon (PA) or EVOH, or in combination with EVOH, to reduce the overall cost of packaging structures. Typically, the structures, such as PET/tie-layer/PE or PE/tie-layer/EVOH/tie-layer/PET are often extruded into films (see, for example, FIG. 1), ranging from 250 to 1250 microns, and thermoformed for packaging applications. Such film structures can also be typically blown into flexible films for packaging. Some conventional tie-layer solutions include maleic anhydride modified ethylene methylacrylate polymers, and maleic anhydride modified ethylene vinyl acetate polymers. The tie layer requirements have been becoming more demanding, requiring higher adhesion properties. However these current tie-layer materials are often disadvantageous because of negative taste and odor properties and/or insufficient thermal stability at high processing temperatures ($\geq 225°$ C.) Thus, there is a need for new film compositions that contain tie-layers that have improved adhesion to polyesters, good high temperature processibility and low taste and odor levels.

U.S. Pat. No. 6,027,776 discloses a multilayer film that includes the following: a) an interior layer of homogeneous ethylene/alpha-olefin copolymer having a density ranging from about 0.89 to about 0.92 grams per cubic centimeter; b) a first exterior layer of a material selected from the group consisting of homopolymer or copolymer of polypropylene, a blend of homopolymer or copolymer of polypropylene and elastomer, high density polyethylene, and copolyester; and c) a second exterior layer of a material selected from the group consisting of polyamide, copolyamide, polyester, copolyester, high density polyethylene, polypropylene, propylene/ethylene copolymer, and polycarbonate. A first adhesive layer is present between the interior layer and the first exterior layer, and a second adhesive layer is present between the interior layer and the second exterior layer.

U.S. Pat. No. 6,183,863 discloses an adhesive ethylene copolymer resin blend of a modified ethylene/α-olefin copolymer, obtained by graft-modifying an unmodified linear ethylene/α-olefin copolymer with an unsaturated carboxylic acid or its derivative, or the unmodified ethylene/α-olefin copolymer and the modified ethylene/α-olefin copolymer, and an olefin elastomer. The linear ethylene/α-olefin copolymer is prepared using an olefin polymerization catalyst including a Group IV transition metal compound (a) containing a ligand having cyclopentadienyl skeleton and an organoaluminum oxy-compound. The adhesive ethylene copolymer composition can be used as a layer, in a laminate, with a layer of a polar material or a layer of a metal. The polar material can be an ethylene/vinyl alcohol copolymer, a polyamide, or a polyester. See also U.S. Pat. No. 6,656,601.

U.S. Publication 2011/0297212 discloses a laminated film having a substrate, and a bonding layer of ethylene polymer on one major surface of the substrate. The bonding layer is placed directly on the substrate, or there is a primer layer between the substrate and bonding layer.

Additional film compositions are disclosed in the following references: U.S. Pat. Nos. 4,639,398; 5,837,358; 6,274,246; 6,663,974; U.S. Publication Nos. 2002/0055006, 2007/0254118, 2008/0197540, 2008/0274328, 2008/0274314, 2010/0029827; International Publication Nos. WO 2008/079784, WO 2010/042334, WO 2010/042335; Japanese Patent References: JP10034836A (Abstract), JP03-106647A (Abstract), JP02551977B2 (Abstract), JP0307557B2 (Abstract), JP7103278B2 (Abstract), JP64-045445 (Abstract), JP2009-019063 (Abstract), JP01-317756 (Abstract), JP06-126882 (Abstract); Journal References: De Gooijer, J. M.; Scheltus, M. and Koning, C. E.; *Polym. Eng. Sci.* 41, 2001, 86-94; Pietrasanta, Y.; Robin, J. J.; Tones, N.; Boutevin, B.; *Macromol. Chem. Phys.* 200, 1999, 142-149; Becker, P. and Kiang, W.; ANTEC, 1991, 1389-94; and Durgun, H; Bayram, G. J. *Adhesion Sci. Technol.*, 19, 2005, 407-425.

However, as discussed above, there remains a need for new multilayer film configurations that contain tie-layers compositions that have improved adhesion to polyesters. These needs and others have been met by the following invention.

SUMMARY OF THE INVENTION

The invention provides a film comprising at least two layers, a first layer and a second layer;

and wherein the first layer is formed from a first composition comprising a polyester, a polylactic acid, or a combination thereof; and wherein the second layer is formed from a second composition comprising at least the following:

A) functionalized ethylene-based polymer, and
B) ethylene/alpha-olefin interpolymer; and wherein the first layer is adjacent to the second layer.

DETAILED DESCRIPTION OF THE INVENTION

Figure 1:
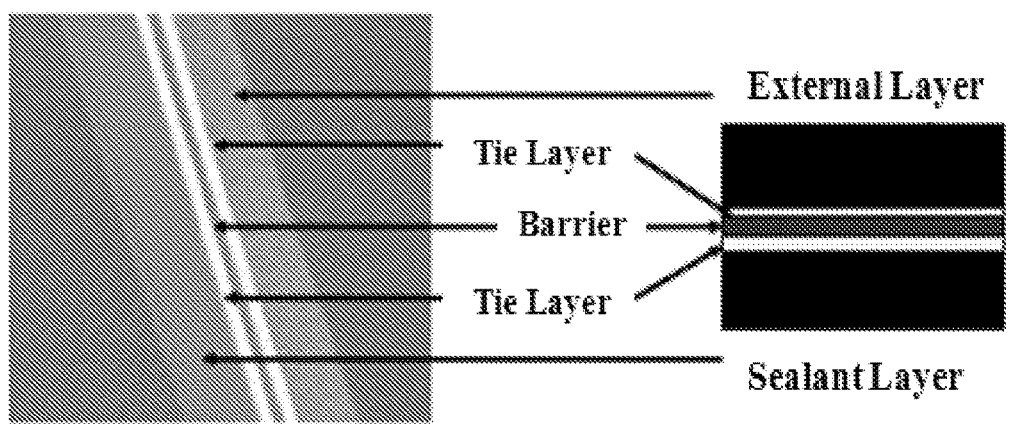
FIG. 1 depicts a multilayer film containing an external layer, a barrier layer, a sealant layer, and tie layers.

As discussed above, the invention provides a film comprising at least two layers, a first layer and a second layer;

and wherein the first layer is formed from a first composition comprising a polyester, a polylactic acid (PLA), or a combination thereof; and wherein the second layer is formed from a second composition comprising at least the following:

A) functionalized ethylene-based polymer, and
B) ethylene/alpha-olefin interpolymer; and wherein the first layer is adjacent to the second layer.

An inventive film may comprise a combination of two or more embodiments described herein.

In one embodiment, the second composition comprises less, or equal to, 80 weight percent of the functionalized ethylene-based polymer of component A, based on the sum weight of component A and component B.

In one embodiment, the second composition comprises less, or equal to, 60 weight percent of the functionalized ethylene-based polymer of component A, based on the sum weight of component A and component B.

In one embodiment, the second composition comprises less, or equal to, 50 weight percent of the functionalized ethylene-based polymer of component A, based on the sum weight of component A and component B.

In one embodiment, the second composition comprises less, or equal to, 40 weight percent of the functionalized ethylene-based polymer of component A, based on the sum weight of component A and component B.

In one embodiment, the second composition comprises less, or equal to, 30 weight percent of the functionalized ethylene-based polymer of component A, based on the sum weight of component A and component B.

In one embodiment, the second composition comprises greater, or equal to, 10 weight percent of the functionalized ethylene-based polymer of component A, based on the sum weight of component A and component B.

In one embodiment, the second composition comprises greater, or equal to, 20 weight percent of the functionalized ethylene-based polymer of component A, based on the sum weight of component A and component B.

In one embodiment, the second composition comprises from 10 to 80 weight percent, and further from 10 to 60 weight percent, and further from 10 to 30 weight percent, of the functionalized ethylene-based polymer of component A, based on the sum weight of component A and component B.

In one embodiment, the second composition comprises from 10 to 50 weight percent, and further from 10 to 40 weight percent, and further from 10 to 30 weight percent, of the functionalized ethylene-based polymer of component A, based on the sum weight of component A and component B.

In one embodiment, the weight ratio of component B to component A is from 99:1 to 10:90, further from 99:1 to 40:60; and further from 99:1 to 50:50.

In one embodiment, the weight ratio of component B to component A is from 9 to 2/3.

In one embodiment, the weight ratio of component B to component A is from 9 to 1.

In one embodiment, the weight ratio of component B to component A is from 4 to 1.

In one embodiment, the second composition comprises less, or equal to, 80 weight percent of the functionalized ethylene-based polymer of component A, based on the weight of the second composition.

In one embodiment, the second composition comprises less, or equal to, 60 weight percent of the functionalized ethylene-based polymer of component A, based on the weight of the second composition.

In one embodiment, the second composition comprises less, or equal to, 50 weight percent of the functionalized ethylene-based polymer of component A, based on the weight of the second composition.

In one embodiment, the second composition comprises less, or equal to, 40 weight percent of the functionalized ethylene-based polymer of component A, based on the weight of the second composition.

In one embodiment, the second composition comprises less, or equal to, 30 weight percent of the functionalized ethylene-based polymer of component A, based on the weight of the second composition.

In one embodiment, the second composition comprises greater, or equal to, 10 weight percent of the functionalized ethylene-based polymer of component A, based on the weight of the second composition.

In one embodiment, the second composition comprises greater, or equal to, 20 weight percent of the functionalized ethylene-based polymer of component A, based on the weight of the second composition.

In one embodiment, the second composition comprises from 10 to 80 weight percent, and further from 10 to 60 weight percent, and further from 10 to 30 weight percent, of the functionalized ethylene-based polymer of component A, based on the weight of the second composition.

In one embodiment, the second composition comprises from 10 to 50 weight percent, and further from 10 to 40 weight percent, and further from 10 to 30 weight percent, of the functionalized ethylene-based polymer of component A, based on the weight of the second composition.

In one embodiment, the second composition comprises greater than, or equal to, 90 weight percent of the "sum weight of components A and B," based on the weight of the second composition.

In one embodiment, the second composition comprises greater than, or equal to, 95 weight percent of the "sum weight of components A and B," based on the weight of the second composition.

In one embodiment, the second composition comprises greater than, or equal to, 98 weight percent of the "sum weight of components A and B," based on the weight of the second composition.

In one embodiment, the second composition has a melt index (I2) from 2 to 10, further from 3 to 8, and further from 4 to 6 g/10 min.

In one embodiment, the second composition has a density from 0.860 to 0.930 g/cc, further from 0.870 to 0.920 g/cc (1 cc=1 cm$^3$).

In one embodiment, the second composition comprises less than 0.5 weight percent, preferably less than 0.1 weight percent, more preferably less than 0.05 weight percent of an ethylene vinyl acetate polymer (EVA).

In one embodiment, the second composition does not comprise an ethylene vinyl acetate polymer (EVA).

The second composition may comprise a combination of two or more embodiments as described herein.

In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene-based homopolymer. In another embodiment, the functionalized ethylene-based polymer is a functionalized ethylene/alpha-olefin interpolymer, and further a functionalized ethylene/alpha-olefin copolymer.

In one embodiment, the functionalized ethylene-based polymer of component A comprises COOH groups and/or anhydride groups.

In one embodiment, the functionalized ethylene-based polymer of component A has a density from 0.870 to 0.950 g/cc.

In one embodiment, the functionalized ethylene-based polymer of component A has a melt index (I2: 2.16 kg/190° C.) from 0.5 g/10 min to 5.0 g/10 min, and further from 1 g/10 min to 3 g/10 min.

In one embodiment, the functionalized ethylene-based polymer of component A comprises units derived from ethylene and maleic anhydride and/or maleic acid.

In one embodiment, the functionalized ethylene-based polymer is a MAH-grafted ethylene-based polymer. In a further embodiment, the MAH-grafted ethylene-based polymer has a melt index (I2) from 0.5 to 10 g/10 min, or from 1 to 6 g/10 min.

In one embodiment, the functionalized ethylene-based polymer is a MAH-grafted ethylene-based polymer. In one embodiment, the MAH-grafted ethylene-based polymer has an MAH-graft level is from 0.05 to 1.20 weight percent, based on the weight of the second composition. In a further embodiment, the MAH-grafted ethylene-based polymer has an MAH-graft level is from 0.07 to 1.00 weight percent, based on the weight of the second composition. In a further embodiment, the MAH-grafted ethylene-based polymer has an MAH-graft level is from 0.10 to 0.60 weight percent, based on the weight of the second composition.

In one embodiment, the functionalized ethylene-based polymer is a MAH-grafted ethylene-based polymer. In one embodiment, the MAH-grafted ethylene-based polymer has an MAH-graft level is from 0.05 to 1.20 weight percent, based on the sum weight of components A and B. In a further embodiment, the MAH-grafted ethylene-based polymer has an MAH-graft level is from 0.07 to 1.00 weight percent, based on the sum weight of components A and B. In a further embodiment, the MAH-grafted ethylene-based polymer has an MAH-graft level is from 0.10 to 0.60 weight percent, based on the sum weight of components A and B.

In one embodiment, the ethylene/alpha-olefin interpolymer of component B (second composition) has a density less than 0.93 g/cc. In a further embodiment, the ethylene/alpha-olefin interpolymer is an ethylene/alpha-olefin copolymer.

In one embodiment, the ethylene/alpha-olefin interpolymer of component B (second composition) has a density less than, or equal to, 0.92 g/cc. In a further embodiment, the ethylene/alpha-olefin interpolymer is an ethylene/alpha-olefin copolymer.

In one embodiment, the ethylene/alpha-olefin interpolymer of component B (second composition) has a density less than, or equal to, 0.90 g/cc. In a further embodiment, the ethylene/alpha-olefin interpolymer is an ethylene/alpha-olefin copolymer.

In one embodiment, the ethylene/alpha-olefin interpolymer of component B (second composition) has a density less than, or equal to, 0.89 g/cc. In a further embodiment, the ethylene/alpha-olefin interpolymer is an ethylene/alpha-olefin copolymer.

In one embodiment, the ethylene/alpha-olefin interpolymer of component B (second composition) has a melting point (Tm) less than 130° C., as determined by DSC. In a further embodiment, the ethylene/alpha-olefin interpolymer is an ethylene/alpha-olefin copolymer.

In one embodiment, the ethylene/alpha-olefin interpolymer of component B (second composition) has a melting point (Tm) less than 100° C., as determined by DSC. In a further embodiment, the ethylene/alpha-olefin interpolymer is an ethylene/alpha-olefin copolymer.

In one embodiment, the ethylene/alpha-olefin interpolymer of component B (second composition) has a melting point (Tm) less than 85° C., as determined by DSC. In a further embodiment, the ethylene/alpha-olefin interpolymer is an ethylene/alpha-olefin copolymer.

In one embodiment, the ethylene/alpha-olefin interpolymer of component B (second composition) has a melting point (Tm) less than 75° C., as determined by DSC. In a further embodiment, the ethylene/alpha-olefin interpolymer is an ethylene/alpha-olefin copolymer.

In one embodiment, the α-olefin of the ethylene/α-olefin interpolymer of component B is a C3-C10 α-olefin. In a further embodiment, the ethylene/α-olefin interpolymer is an ethylene/α-olefin copolymer.

In one embodiment, the ethylene/α-olefin interpolymer of component B has a melt index (I2) greater than, or equal to, 0.1 g/10 min, or greater than, or equal to, 0.5 g/10 min, or greater than, or equal to, 1.0 g/10 min. In a further embodiment, the ethylene/alpha-olefin interpolymer is an ethylene/alpha-olefin copolymer.

In one embodiment, the ethylene/α-olefin interpolymer of component B has a melt index (I2) less than, or equal to, 50 g/10 min, or less than, or equal to, 20 g/10 min, or less than, or equal to, 10 g/10 min. In a further embodiment, the ethylene/alpha-olefin interpolymer is an ethylene/alpha-olefin copolymer.

In one embodiment, the ethylene/α-olefin interpolymer of component B has a melt index (I2) from 0.1 to 50 g/10 min, or from 0.5 to 20 g/10 min, or from 1.0 to 10 g/10. In a further embodiment, the ethylene/alpha-olefin interpolymer is an ethylene/alpha-olefin copolymer.

In one embodiment, the second composition further comprises C) an ethylene/alpha-olefin interpolymer with a melt viscosity less than, or equal to, 50,000 cP at 350° F., and further less than, or equal to, 30,000 cP at 350°. In a further embodiment, the ethylene/alpha-olefin interpolymer is an ethylene/alpha-olefin copolymer.

In one embodiment, the an ethylene/alpha-olefin interpolymer of component C has a density less than, or equal to, 0.90 g/cc, further less than, or equal to, 0.89 g/cc, and further less than, or equal to, 0.88 g/cc. In a further embodiment, the ethylene/alpha-olefin interpolymer is an ethylene/alpha-olefin copolymer.

In one embodiment, the an ethylene/alpha-olefin interpolymer of component C has a density greater than, or equal to, 0.85 g/cc, further greater than, or equal to, 0.86 g/cc, and further greater than, or equal to, 0.87 g/cc. In a further embodiment, the ethylene/alpha-olefin interpolymer is an ethylene/alpha-olefin copolymer.

In one embodiment, the alpha-olefin of the ethylene/alpha-olefin interpolymer of component C is a C3-C10 alpha-olefin, and further selected from propylene, 1-butene, 1-hexene and 1-octene. In a further embodiment, the ethylene/alpha-olefin interpolymer is an ethylene/alpha-olefin copolymer.

In one embodiment, the ethylene/alpha-olefin interpolymer of component C, and further an ethylene/alpha-olefin copolymer, is present in an amount from 5 to 20 weight percent, based on the weight of the second composition. In a further embodiment, the second composition comprises from 40 to 50 weight percent of the functionalized ethylene-based polymer, based on the weight of the second composition.

The ethylene/alpha-olefin interpolymer, and further an ethylene/alpha-olefin copolymer, of component C may comprise a combination of two or more embodiments as described herein.

In one embodiment, the second composition further comprises one or more additives. In a further embodiment, the one or more additives are selected from antioxidants, fillers, or combinations thereof.

The second composition may comprise a combination of two or more embodiments as described herein.

The functionalized ethylene-based polymer of component B may comprise a combination of two or more embodiments as described herein.

The ethylene/α-olefin interpolymer of component B may comprise a combination of two or more embodiments as described herein.

In one embodiment, the first composition comprises greater than, or equal to, 40 weight percent of the polyester, the PLA, or the combination thereof, based on the weight of the first composition.

In one embodiment, the first composition comprises greater than, or equal to, 50 weight percent of the polyester, the PLA, or the combination thereof, based on the weight of the first composition.

In one embodiment, the first composition comprises greater than, or equal to, 60 weight percent of the polyester, the PLA, or the combination thereof, based on the weight of the first composition.

In one embodiment, the first composition comprises greater than, or equal to, 70 weight percent of the polyester, the PLA, or the combination thereof, based on the weight of the first composition.

In one embodiment, the first composition comprises greater than, or equal to, 80 weight percent of the polyester, the PLA, or the combination thereof, based on the weight of the first composition.

In one embodiment, the first composition comprises greater than, or equal to, 90 weight percent of the polyester, the PLA, or the combination thereof, based on the weight of the first composition.

In one embodiment, the first composition comprises greater than, or equal to, 95 weight percent of the polyester, the PLA, or the combination thereof, based on the weight of the first composition.

In one embodiment, the first composition comprises greater than, or equal to, 98 weight percent of the polyester, the PLA, or the combination thereof, based on the weight of the first composition.

In one embodiment, the first composition comprises a polyester.

In one embodiment, the first composition comprises greater than, or equal to, 40 weight percent of the polyester, based on the weight of the first composition.

In one embodiment, the first composition comprises greater than, or equal to, 50 weight percent of the polyester, based on the weight of the first composition.

In one embodiment, the first composition comprises greater than, or equal to, 60 weight percent of the polyester, based on the weight of the first composition.

In one embodiment, the first composition comprises greater than, or equal to, 70 weight percent of the polyester, based on the weight of the first composition.

In one embodiment, the first composition comprises greater than, or equal to, 80 weight percent of the polyester, based on the weight of the first composition.

In one embodiment, the first composition comprises greater than, or equal to, 90 weight percent of the polyester, based on the weight of the first composition.

In one embodiment, the first composition comprises greater than, or equal to, 95 weight percent of the polyester, based on the weight of the first composition.

In one embodiment, the first composition comprises greater than, or equal to, 98 weight percent of the polyester, based on the weight of the first composition.

In one embodiment, the polyester has a melting temperature greater than 230° C., and further greater than 240° C., as determined by DSC.

Examples of polyesters include, but are not limited to, PET (polyethylene terephthalate), PBT (polybutylene terephthalate), and other similar polymers.

In one embodiment, the first composition further comprises one or more additives. In a further embodiment, the one or more additives are selected from antioxidants, fillers, or combinations thereof.

The first composition may comprise a combination of two or more embodiments as described herein.

In one embodiment, for the inventive film, the thickness ratio of the first layer to the second layer is from 0.70 to 0.99.

In one embodiment, the film comprises a third layer formed from a composition comprising an EVOH, a polyamide, or a combination thereof.

In one embodiment, the inventive film comprises less than 0.5 weight percent, preferably less than 0.1 weight percent, more preferably less than 0.05 weight percent of a LDPE (high pressure, free-radical polymerized).

In one embodiment, the inventive film does not comprise a LDPE (high pressure, free-radical polymerized).

In one embodiment, the inventive film comprises less than 0.5 weight percent, preferably less than 0.1 weight percent, more preferably less than 0.05 weight percent of a tackifier.

In one embodiment, the inventive film does not comprise a tackifier.

In one embodiment, the first layer and the second layer comprise, together, from 10 to 50 percent, further from 15 to 50 percent, and further from 20 to 50 weight percent of the total film thickness.

An inventive film may comprise a combination of two or more embodiments as described herein.

The term "film," as used herein, refers to both films and sheets, and typically an inventive will have a thickness greater, or equal to, than 50 microns. A film will typically contain multiple layers.

The invention also provides an article comprising an inventive film as described herein.

An inventive article may comprise a combination of two or more embodiments as described herein.

Ethylene/α-Olefin Interpolymer (Component B—Second Composition)

Ethylene/α-olefin interpolymers include, but are not limited to, polymers formed by polymerizing ethylene with one or more, and preferably one, C3-C10 α-olefin(s). Illustrative α-olefins include propylene, 1-butene, 1-pentene, 1-hexene, 4-methyl-1-pentene, 1-heptene, 1-octene, 1-nonene and 1-decene. Preferably, the α-olefin is propylene, 1-butene, 1-hexene or 1-octene. Preferred copolymers include ethylene/propylene (EP) copolymers, ethylene/butene (EB) copolymers, ethylene/hexene (EH) copolymers, ethylene/octene (EO) copolymers.

Commercial examples of suitable ethylene/α-olefin interpolymers include, but are not limited to, ENGAGE Polyolefin Elastomers available from The Dow Chemical Company; EXCEED and EXACT polymers available from ExxonMobil Chemical Company; and TAFMER polymers available from the Mitsui Chemical Company.

In one embodiment, the ethylene/α-olefin interpolymer has a melting point (Tm) greater than 40° C., or greater than 45° C., or greater than 50° C., as determined by DSC. In a further embodiment, the ethylene/α-olefin interpolymer is an ethylene/α-olefin copolymer.

In one embodiment, the ethylene/α-olefin interpolymer has a melting point (Tm) less than 130° C., or less than 100° C., or less than 85° C., as determined by DSC. In a further embodiment, the ethylene/α-olefin interpolymer is an ethylene/α-olefin copolymer.

In one embodiment, the ethylene/α-olefin interpolymer has a percent crystallinity of less than, or equal to, 40 percent, or less than, or equal to, 35 percent, or less than, or equal to, 30 percent, or less than, or equal to, 25 percent, or less than, or equal to, 15 percent, as measured by DSC. In a further embodiment, the ethylene/α-olefin interpolymer is an ethylene/α-olefin copolymer.

In one embodiment, the ethylene/α-olefin interpolymer has a percent crystallinity of greater than, or equal to, 2 percent, or greater than, or equal to, 5 percent, or greater than, or equal to, 8 percent, as measured by DSC. In a further embodiment, the ethylene/α-olefin interpolymer is an ethylene/α-olefin copolymer.

In one embodiment, the ethylene/α-olefin interpolymer has a density greater than, or equal to, 0.850 g/cc, or greater than, or equal to, 0.855 g/cc, or greater than, or equal to, 0.860 g/cc. In a further embodiment, the ethylene/α-olefin interpolymer is an ethylene/α-olefin copolymer.

In one embodiment, the ethylene/α-olefin interpolymer has a density less than, or equal to, 0.920 g/cc, or less than, or equal to, 0.910 g/cc, or less than, or equal to, 0.900 g/cc. In a further embodiment, the ethylene/α-olefin interpolymer is an ethylene/α-olefin copolymer.

In one embodiment, the ethylene/α-olefin interpolymer has a melt index (I2) greater than 0.1 g/10 min, or greater than, or equal to, 0.5 g/10 min, or greater than, or equal to, 1.0 g/10 min. In a further embodiment, the ethylene/α-olefin interpolymer is an ethylene/α-olefin copolymer.

In one embodiment, the ethylene/α-olefin interpolymer has a melt index (I2) less than, or equal to, 100 g/10 min, or less than, or equal to, 50 g/10 min, or less than, or equal to, 20 g/10 min, or less than, or equal to, 10 g/10 min. In a further embodiment, the ethylene/α-olefin interpolymer is an ethylene/α-olefin copolymer.

In one embodiment, the ethylene/α-olefin interpolymer has molecular weight distribution (Mw/Mn) greater than, or equal to, 1.1, or greater than, or equal to, from 1.2, or greater than, or equal to, 1.5, or greater than, or equal to, 1.7, as determined by GPC. In a further embodiment, the ethylene/α-olefin interpolymer is an ethylene/α-olefin copolymer.

In one embodiment, the ethylene/α-olefin interpolymer has molecular weight distribution (Mw/Mn) less than, or equal to, 4.0, or less than, or equal to, from 3.5, or less than, or equal to, 2.5, or less than, or equal to, 2.1, as determined by GPC. In a further embodiment, the ethylene/α-olefin interpolymer is an ethylene/α-olefin copolymer.

In one embodiment, the ethylene/α-olefin interpolymer is a homogeneously branched linear interpolymer, and preferably a copolymer, or a homogeneous branched substantially linear interpolymer, and preferably a copolymer.

In one embodiment, the ethylene/α-olefin interpolymer is a homogeneous branched substantially linear interpolymer, and preferably a copolymer.

In one embodiment, the ethylene/α-olefin interpolymer is a homogeneous branched linear interpolymer, and preferably a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. No. 4,701,432; U.S. Pat. No. 4,937,301; U.S. Pat. No. 4,935,397; U.S. Pat. No. 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the invention have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature.

See, for example, Zimm, B H and Stockmayer, W. H., J. Chem. Phys., 17, 1301 (1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

An ethylene/α-olefin interpolymer may comprise a combination of two or more embodiments as described herein.

An ethylene/α-olefin copolymer may comprise a combination of two or more embodiments as described herein.

Functionalized Ethylene-Based Polymer (Component A—Second Composition)

The term "functionalized ethylene-based polymer," as used herein, refers to an ethylene-based polymer that comprises at least one chemical group (chemical substituent), linked by a covalent bond, and which group comprises at least one hetero-atom. A heteroatom is defined as an atom which is not carbon or hydrogen. Common heteroatoms include, but are not limited to, oxygen, nitrogen, sulfur, phosphorus.

Some examples of compounds that can be grafted onto the ethylene-based polymer include ethylenically unsaturated carboxylic acids and acid derivatives, such as esters, anhydrides, and acid salts. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and mixtures thereof. Maleic anhydride is a preferred compound.

In one embodiment, the functionalized ethylene-based polymer comprises at least one functional group selected from the following:

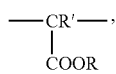

anhydride, and combinations thereof; and wherein R is hydrogen or alkyl, R' is hydrogen or alkyl. In a further embodiment, each alkyl group is, independently, methyl, ethyl, propyl or butyl. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer.

In one embodiment, the functionalized ethylene-based polymer comprises at least one anhydride group; and further at least one maleic anhydride group. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer.

In one embodiment, the functionalized ethylene-based polymer is a maleic anhydride-grafted polymer. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer.

In one embodiment, the functionalized ethylene-based polymer has a density from 0.86 to 0.96 g/cc, further from 0.87 to 0.94 g/cc, and further from 0.87 to 0.92 g/cc. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer.

In one embodiment, the functionalized ethylene-based polymer has a melt index (I2: 2.16 kg/190° C.) from 0.1 g/10 min to 50 g/10 min, or from 0.5 g/10 min to 20 g/10 min, or from 1.0 g/10 min to 10 g/10 min. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer.

Suitable commercial functionalized olefin-based polymers include AMPLIFY GR Functional Polymers, available from The Dow Chemical Company.

A functionalized ethylene-based polymer may comprise a combination of two or more embodiments as described herein.

A functionalized ethylene homopolymer may comprise a combination of two or more embodiments as described herein.

A functionalized ethylene/alpha-olefin interpolymer may comprise a combination of two or more embodiments as described herein.

A functionalized ethylene/alpha-olefin copolymer may comprise a combination of two or more embodiments as described herein.

Additives

In one embodiment, a polymer composition (for example, first composition and/or second composition) comprises at least one additive. Suitable additives include, but are not limited to, antioxidants, UV stabilizers, foaming agents, flame retardants, colorants or pigments, and combinations thereof.

In one embodiment, a composition comprises at least one filler. In a further embodiment, the filler is selected from carbon black, talc, calcium carbonate, clay or combinations thereof. In one embodiment, the filler is present in an amount less than, or equal to, 70 weight percent, or less than, or equal to, 50 weight percent, or less than, or equal to, 30 weight percent, based on the weight of the composition. In one embodiment, the filler is present in an amount greater than, or equal to, 2 weight percent, or greater than, or equal to, 5 weight percent, or greater than, or equal to, 10 weight percent based on the weight of the composition.

Applications

The invention also provides for an article comprising at least one component formed from an inventive film. Articles include, but are not limited to coextruded films and sheets, packaging films, thermoformed trays, shrink bags and lidding films, and lamination films.

Compositions may be formed into a finished article of manufacture by any one of a number of conventional processes and apparatus. Illustrative processes include, but are not limited to, extrusion, coextrusion, calendaring, injection molding, compression molding, lamination, microlayer coextrusion, blow molding, and other typical processes known in the art.

Definitions

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues may be incorporated into the polymer structure and/or within the bulk polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and an α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Determination of the Maleic Anhydride (MAH) Content—Functionalized Ethylene-Based Polymer and Second Composition Calibration: The maleic anhydride content was measured as follows. The dried resin sample (1-2 grams; functionalized polymer, or composition containing the MAH functionalized ethylene-based polymer and the ethylene/α-olefin interpolymer (composition typically stabilized with ppm amounts of one more stabilizers)) was dissolved in 150 ml xylene, by heating the sample to 100° C., while stirring, on a stirred hot plate. Upon dissolution, the sample was titrated, while hot, with "0.025N tetrabutylammonium hydroxide (TBAOH) in 1:1 toluene/methanol" using 10 drops of bromothymol blue as an indicator. The endpoint was recorded when the solution turned blue.

FTIR: FTIR spectra were used for determining the level of g-MAH in each sample, using the method calibrated against the TBAOH titration analysis described above. The weight percent of g-MAH was determined from the ratio of the height of the peak at ca. 1790 cm$^{-1}$, corresponding to the carbonyl stretch of the anhydride, to the height of the 2751 cm$^{-1}$, as follows.

$$\text{wt \% } MAH = 0.0313 \times \frac{(\text{peak height@ } ca. \text{ 1790 cm}^{-1})}{(\text{peak height@ } ca. \text{ 2751 cm}^{-1})} + 0.2145 \times \frac{(\text{peak height@ } ca. \text{ 1790 cm}^{-1})}{(\text{peak height@ } ca. \text{ 2751 cm}^{-1})} + 0.0645$$

Melt Index

Melt index (I2) was measured in accordance with ASTM D-1238 (190° C.; 2.16 kg). The result was reported in grams/10 minutes. Melt flow rate (MFR) was measured in accordance with ASTM D-1238 (230° C.; 2.16 kg). The result was reported in grams/10 minutes.

Density

Density was measured in accordance with ASTM D-792.

Gel Permeation Chromatography (GPC)

Conventional GPC measurements are used to determine the weight-average (Mw) and number-average (Mn) molecular weight of the polymer, and to determine the MWD (=Mw/Mn). "Samples are analyzed with a high-temperature GPC instrument (Polymer Laboratories, Inc. model PL220).

The method employs the well-known universal calibration method based on the concept of hydrodynamic volume, and the calibration is performed using narrow polystyrene (PS) standards, along with four Mixed A 20 μm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M\text{polyethylene}=a*(M\text{polystyrene})^b.$$

In this equation, a=0.4316 and b=1.0. Weight average molecular weight (Mw) and number average molecular weight (Mn) are each calculated in the usual manner. For example, Mw is calculated the following formula: Mw=Σwi Mi, where wi and Mi are the weight fraction and molecular weight, respectively, of the ith fraction eluting from the GPC column.

Differential Scanning calorimetry (DSC)

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst. =($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Melt Viscosity

Melt viscosity is measured in accordance with ASTM D 3236 (350° F.), using a Brookfield Digital Viscometer (Model DV-II+, version 3), and disposable aluminum sample chambers. The spindle used, in general, is a "SC-31 hot-melt spindle," suitable for measuring viscosities in the range from 10 to 100,000 centipoise. The sample is poured into the chamber, which is, in turn, inserted into a Brookfield Thermoset, and locked into place. The sample chamber has a notch on the bottom that fits the bottom of the Brookfield Thermoset, to ensure that the chamber is not allowed to turn when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued until the brackets on the viscometer align on the Thermoset. The viscometer is turned on, and set to operate at a shear rate which leads to a torque reading in the range of 40 to 60 percent of the total torque capacity, based on the RPM output of the viscometer. Readings are taken every minute, for about 15 minutes, or until the values stabilize, at which point, a final reading is recorded.

EXPERIMENTAL

I. Polymers

The polymers used in this study are shown in Table 1 below. Polymers are typically stabilized with one or more antioxidants and/or other stabilizers.

TABLE 1

Polymers Used in Study

| Materials | Description | Co-monomer wt % | I2 (g/10 min) | Tm (° C.) | Density (g/cc) |
|---|---|---|---|---|---|
| EEA | Ethylene-ethylacrylate copolymer | 18.5% EA | 6.0 | 97.8 | 0.931 |
| MAH-g-EO | Maleic anhydride (MAH) grafted ethylene-octene copolymer | 0.8% MAH | 1.3 | 62.8 | 0.875 |
| MAH-g-HDPE | Maleic anhydride (MAH) grafted high density polyethylene | 1.2% MAH | 2.0 | 130 | 0.958 |
| EO 200[a] | Ethylene-octene copolymer | — | 5 | 63 | 0.870 |
| EO 27[b] | Ethylene-octene copolymer | — | 4.0 | 127 | 0.941 |
| EO 230[c] | Ethylene-octene copolymer blend | — | 4.0 | 122 | 0.916 |
| EO 850[a] | Ethylene-octene copolymer | — | 3.0 | 98.0 | 0.902 |
| EO 770[a] | Ethylene-octene copolymer | — | 1.0 | 82 | 0.885 |
| OREVAC T 9304 | Ethylene-vinylacetate-maleic anhydride terpolymer | | | | |
| BYNEL 3860 | Anhydride modified ethylene vinyl acetate polymer | | | | |
| LOTRYL 28MA07 | Ethylene-methylacrylate copolymer | | | | |
| LOTADER AX8900 | Ethylene-methylacrylate-glycidylmethacrylate terpolymer | | | | |

[a]Homogeneously branched substantially linear copolymer.
[b]Heterogeneously branched linear copolymer.
[c]Heterogeneously branched copolymer/homogeneously branched copolymer composition.

II. Tie Layer Compositions and Preparation (HAAKE Bowl Blends)

Compositions were prepared on a "50 cc HAAKE Bowl." All components were added to the HAAKE Bowl at 190° C., and mixed at 50 RPM for seven minutes, under nitrogen purge. Compositions and films are shown in Tables 2-5. Amounts are in weight percent, based on the sum weight of the polymer components.

III.1—Injection Molding of the PET Plaques

The poly(ethylene terephthalate) (PET) resin (ADN5001 available from Andenie; IV around 0.8 dl/g (ASTM D5225), Tm≥245° C. (WN-B010-7089E)) was injection molded into "4 inch×6 inch×0.125 inch thick" plaques (melt temp.=277° C., mold temp.=20° C., injection velocity=200 mm/sec, hold pressure=5.52 MPa).

III.2—Compression Molding of the Tie Layer Composition Film

Each tie layer composition was compression molded into a film using a "55 mils" thick chase, at 190° C., under a pressure of 40,000 psi, for 4 minutes. Sample dimensions were "4 inch×6 inch×55 mils thick."

III.3—Test Sample Preparation (PET/Tie Layer Sandwich)

Figure 2:
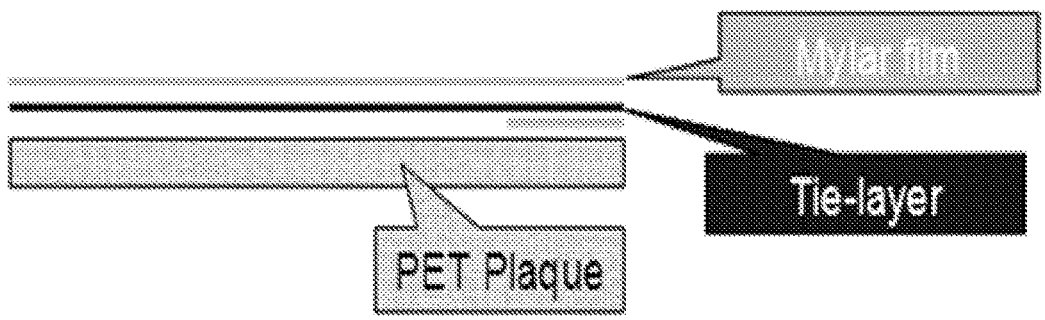
FIG. 2 depicts the "PET-Tie layer" sandwich structure used to test adhesion of tie-layer to PET.

A manual press was used to make a sandwich of the PET with each tie layer film. The top plate of the manual press was heated to 260° C., and the bottom plate was kept at 23° C. The PET plaque (thickness of 0.125 inch), the tie layer film (thickness of 55 mils), a strip of TEFLON film (available from DuPont) of "4 inch width by 1 inch length," and a strip of MYLAR film (available from DuPont) of "4 inch by 6 inch," were all washed with acetone. The piece of MYLAR film (external film) covered the full surface area of the plague assembly. The piece of TEFLON film (4 inch×1 inch) was inserted between PET plaque and the tie layer film, and severed as a release layer to initiate the adhesion test. Two chases, one "4 inch by 6 inch by 0.125 inch thick," and the other, "31 mils thick," were stacked on top of each other (tie-layer thickness of 55 mils). In FIG. 2, the TEFLON film is partially located between the tie layer and the PET plaque, and represented by a light grey line. The sandwich of the plaques assembly (PET plaque/TEFLON Film/Tie-Layer/MYLAR Film) was placed between the two chases, and this final assembly was placed on the cold plate of the manual press. The press was increased to a pressure of 1,000 psi, for 5 minutes, and then to 3,000 psi, for 3 minutes. Each plaque assembly was cooled, at ambient conditions, on the bench top. Strips (½ inch width) of each plaque assembly were then cut from the compression molded assembly.

III.4—Adhesion Measurement

Figure 3:
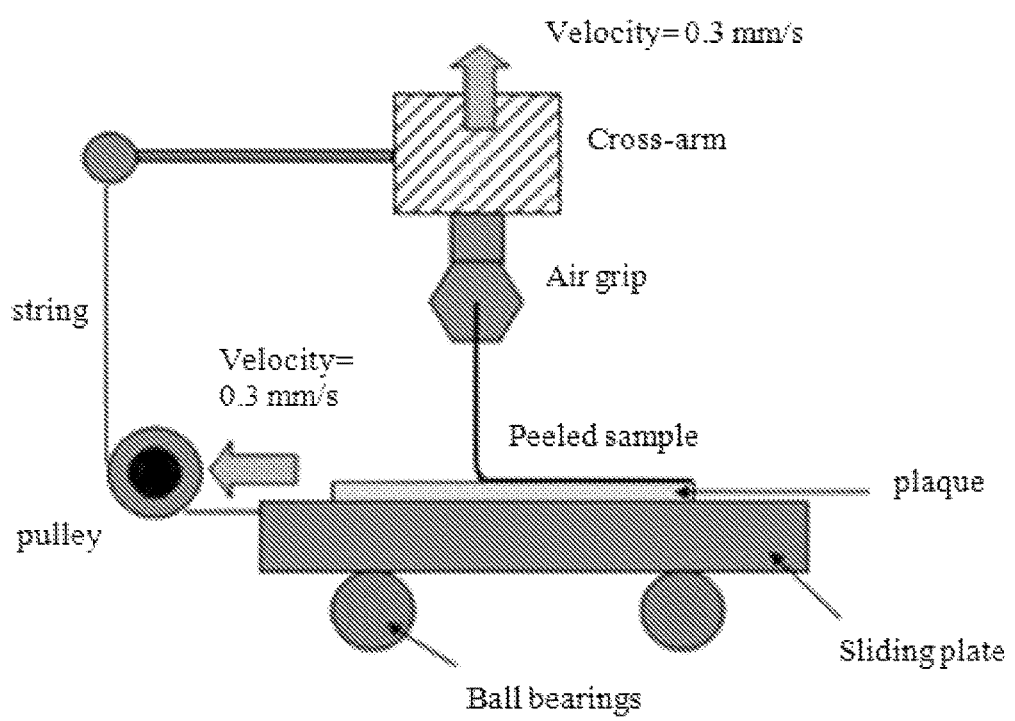
FIG. 3 depicts the "90 degree peel adhesion" test set-up.

Each compression molded plaque assembly, as discussed above, was subject to an adhesion test, to test the adhesion of tie-layer to the PET plaque. Adhesion was measured via a "90 degree peel" set-up, as shown in FIG. 3. A strip (½ inch wide) of the plaque was used as the test sample. At least a "1 inch ear" of the tie layer was clamped into the top air grip, while the rigid PET plaque was clamped down with screws and double-sided tape. Both the PET plaque and the tie layer were pulled at 0.3 mm/s. For each tie-layer composition, five strips were tested, and the average peel strength reported (both in kgf and N/mm.).

IV. Adhesion Testing and Results

Comparative Films

As shown in Table 2, the films containing the tie-layer compositions of neat BYNEL 3860, LOTADER 28MA07, and OREVAC 9304 show good to moderate adhesion to PET; however, such compositions ("vinyl acetate-containing" and "acrylate-containing") are typically not preferred because of lower thermal stability at high processing temperatures (e.g., greater than, or equal to, 225° C.) and/or taste issues and/or odor issues. The films containing the neat EEA, MAH-g-EO, MAH-g-HDPE, and EO 200 showed lower adhesion to PET.

TABLE 2

| Composition (Tie-Layer) | A | B | C | D | E | F | G |
|---|---|---|---|---|---|---|---|
| OREVAC 9304 | 100 | | | | | | |
| BYNEL 3860 | | 100 | | | | | |
| MAH-g-EO | | | 100 | | | | |
| LOTRYL 28MA07 | | | | 100 | | | |
| EEA | | | | | 100 | | |
| EO 200 | | | | | | 100 | |
| MAH-g-HDPE | | | | | | | 100 |
| Film - Adhesion Peel Strength | | | | | | | |
| (kgf) | 4 | 4.2 | 3.2 | 1 | 1.75 | 0.1 | no delamination |
| N/mm | 3.1 | 3.2 | 2.5 | 0.8 | 1.4 | 0.1 | no delamination |
| Standard deviation (N/mm) | 0.01 | 0.04 | 0.20 | 0.30 | 0.40 | 0.1 | N/A |

Films Containing Tie-Layers Containing EO 200 and the MAH-g-EO:

Table 3 shows the adhesion results for tie-layer compositions containing EO 200 and the MAH-g-EO. As seen in Table 3, all the inventive films had excellent adhesion results. Film L containing a tie layer composition containing 100 wt % EO 200 had very low adhesion to PET, whereas the inventive films had high adhesion to PET.

TABLE 3

(Polymer amounts in wt %, based on sum weight of two polymer components)

| | Composition | | | | |
|---|---|---|---|---|---|
| | L | 1 (Inv.) | 2 (Inv.) | 3 (Inv.) | 4 (Inv.) |
| MAH-g-EO (wt %) | 0 | 10 | 20 | 35 | 50 |
| EO 200 (wt %) | 100 | 90 | 80 | 65 | 50 |
| MAH-g-Level (wt %)* | 0 | 0.08 | 0.16 | 0.28 | 0.40 |
| Film - Adhesion Peel Strength | | | | | |
| (kgf) | 0.1 | 3.8 | 3.8 | 4.6 | 4 |
| N/mm | 0.1 | 2.9 | 2.9 | 3.5 | 3.1 |

*wt % based on sum weight of polymer components.

Films Containing Tie-Layers Containing EO 200 and MAH-g-HDPE

Table 4 shows the adhesion results for tie-layer compositions containing EO 200 and the MAH-g-HDPE. As seen in Table 4, all the inventive films had excellent adhesion results. The inventive films showed comparable or better adhesion as compared to films containing BYNEL 3860 or OREVAC 9304 (see Table 2).

TABLE 4

(Polymer amounts in wt %, based on sum weight of two polymer components)

| | Composition | | | | |
|---|---|---|---|---|---|
| | M<br>100 wt %<br>EO 200 | 5<br>10 wt % MAH-g-HDPE<br>90 wt % EO 200 | 6<br>25 wt % MAH-g-HDPE<br>75 wt % EO 200 | 7<br>50 wt % MAH-g-HDPE<br>50 wt % EO 200 | 8<br>75 wt % MAH-g-HDPE<br>25 wt % EO 200 |
| MAH-g-Level (wt %)* | 0 | 0.12 | 0.30 | 0.60 | 0.90 |
| Film - Adhesion | | | | | |
| Peel Strength (kgf) | 0.1 | 4.2 | 6 | no delamination | no delamination |
| Film - Adhesion | | | | | |
| Peel Strength (N/mm) | 0.1 | 3.2 | 4.6 | no delamination | no delamination |

*wt % based on sum weight of polymer components.

Films Containing Tie-Layers Containing Various PEs and the MAH-g-EO

Table 5 shows the adhesion results for tie-layer compositions containing various ethylene-based polymers and the MAH-g-EO. As seen in Table 5, all the inventive films had excellent adhesion results. Films 11-13 showed significantly better adhesion than the comparative films BYNEL 3860 and OREVAC 9304 (see Table 2).

TABLE 5

(Polymer amounts in wt %, based on sum weight of two polymer components)

| | Composition | | | | |
|---|---|---|---|---|---|
| | 9<br>50 wt % MAH-g-EO<br>50 wt % EO 27 | 10<br>50 wt % MAH-g-EO<br>50 wt % EO 230 | 11<br>50 wt % MAH-g-EO<br>50 wt % EO 850 | 12<br>50 wt % MAH-g-EO<br>50 wt % EO 770 | 13<br>50 wt % MAH-g-EO<br>50 wt % EO 200 |
| MAH-g-Level (wt %)* | 0.40 | 0.40 | 0.40 | 0.40 | 0.40 |
| Film - Adhesion | | | | | |
| Peel Strength kgf) | 0.1 | 4.2 | 6 | no delamination | no delamination |

TABLE 5-continued (Polymer amounts in wt %, based on sum weight of two polymer components)

| | Composition | | | | |
|---|---|---|---|---|---|
| | 9 | 10 | 11 | 12 | 13 |
| | 50 wt % MAH-g-EO 50 wt % EO 27 | 50 wt % MAH-g-EO 50 wt % EO 230 | 50 wt % MAH-g-EO 50 wt % EO 850 | 50 wt % MAH-g-EO 50 wt % EO 770 | 50 wt % MAH-g-EO 50 wt % EO 200 |
| Peel Strength (N/mm) | 0.1 | 3.2 | 4.6 | no delamination | no delamination |

*wt % based on sum weight of polymer components.

V. Summary of Results

The inventive films containing the tie-layer compositions, containing the ethylene/alpha-olefin polymers and the MAH functionalized ethylene-based polymers, had overall excellent adhesion properties to PET substrate, as compared to the comparative films examined. The high adhesion is important in meeting the stringent adhesion requirements of post processing applications, such as thermoforming. Also, the inventive films should not suffer from taste and odor issues. It is noted that the comparative film containing the tie composition containing 100 weight percent of the ethylene/alpha-olefin polymer had very low adhesion to PET, whereas the inventive films had high adhesion to PET. It is also noted that the inventive films that each contained a tie composition containing a homogeneously branched polymer, and preferably a homogeneously branched substantially linear polymer, had better adhesion than the film that contained a tie composition containing a heterogeneously branched polymer.

The excellent adhesive properties found in the inventive films are desirable in coextruded films, and indicate good adhesion in coextruded films. These positive adhesion properties would also be found in a multi-layer film, coextrusion process, where, for example, the structure would be ABC, or ABDBC, where A=PET or PLA, B=tie layer, C=olefin-based polymer, and D=polyamide or EVOH copolymer.

The invention claimed is:

1. A film comprising at least two layers, a first layer and a second layer;
    and wherein the first layer is formed from a first composition comprising a polyester, a polylactic acid (PLA), or a combination thereof; and
    wherein the second layer is formed from a second composition comprising at least the following:
    A) an ethylene-based polymer, which is a maleic anhydride grafted-HDPE with a melt index from (I2) 1.0 to 3.0 g/10 min, and
    B) an ethylene/alpha-olefin copolymer with a density from 0.870 to 0.885/cc and a melt index (I2) from 1 to 5 g/10 min; and
    wherein the first layer is adjacent to the second layer; and
    wherein the sum weight of components A and B comprise greater than, or equal to, 98 weight percent of the second composition; and
    wherein components A and B are the only polymer components of the second composition; and
    wherein second composition comprises from 10 to 75 weight percent of the maleic anhydride grafted-HDPE, based on the weight of the second composition; and
    wherein the amount of maleic anhydride graft level (MAH-g-level) is from 0.12 to 0.90 wt %, based on the sum weight of components A and B, and wherein at each MAH-g-level, the composition has a Peel Strength ≥3.2 N/mm.

2. The film of claim 1, wherein the second composition comprises less than, or equal to, 60 weight percent of the maleic anhydride grafted-HDPE of component A, based on the sum weight of component A and component B.

3. The film of claim 1, wherein the ethylene/alpha-olefin copolymer of component B (second composition) has a melting point (Tm) less than 85° C., as determined by DSC.

4. An article comprising the film of claim 1.

5. The film of claim 1, wherein the thickness ratio of the first layer to the second layer is from 0.70 to 0.99.

6. The film of claim 5, wherein the first layer and the second layer comprise, together, from 10 to 50 percent, of the total film thickness.

* * * * *